United States Patent [19]

Forscher

[11] 4,348,086
[45] Sep. 7, 1982

[54] CAMERA ATTACHMENT FOR OBTAINING INSTANTANEOUS CONTACT PRINTS

[76] Inventor: Martin Forscher, 71 Deepwood Dr., Chappaqua, N.Y. 10514

[21] Appl. No.: 316,851

[22] Filed: Oct. 30, 1981

[51] Int. Cl.³ .................. G03B 17/52; G03B 17/56
[52] U.S. Cl. ........................... 354/83; 354/124; 354/174; 354/295
[58] Field of Search ............ 354/295, 275, 124, 210, 354/174, 195, 83, 202, 288, 84–86

[56] References Cited

U.S. PATENT DOCUMENTS

| | | | |
|---|---|---|---|
| 3,266,396 | 8/1966 | Padelt | 354/275 |
| 3,491,671 | 1/1970 | Engeldrum | 354/288 |
| 3,800,311 | 3/1974 | Olsson | 354/195 X |
| 3,852,780 | 12/1974 | Augustin et al. | 354/275 X |

FOREIGN PATENT DOCUMENTS 2654572  6/1978  Fed. Rep. of Germany ........ 354/83

*Primary Examiner*—John Gonzales
*Attorney, Agent, or Firm*—Henry R. Lerner

[57] ABSTRACT

An attachment to a camera for obtaining instantaneous photographic prints of pictures taken by the camera is disclosed. The conventional back cover of a camera is replaced by a modified back cover having a cutout in which there is mounted a fiber optic face plate. A conventional Polaroid back is attached to the modified back, and the fiber optic face plate transfers the image formed on the focal plane of the camera to the plane of the Polaroid film, so that a contact print can be instantaneously obtained of the picture taken through the camera's regular optical system.

9 Claims, 7 Drawing Figures

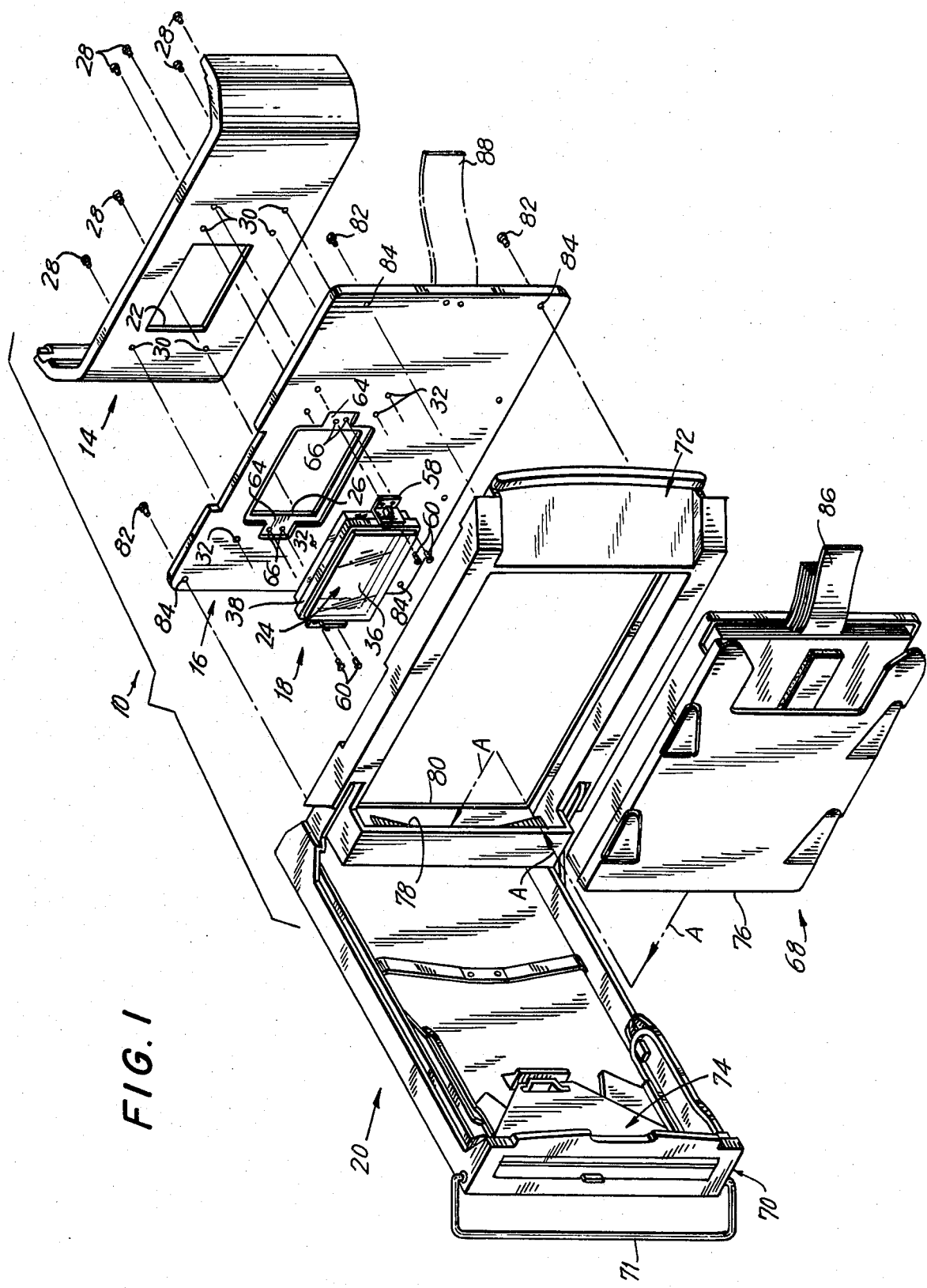

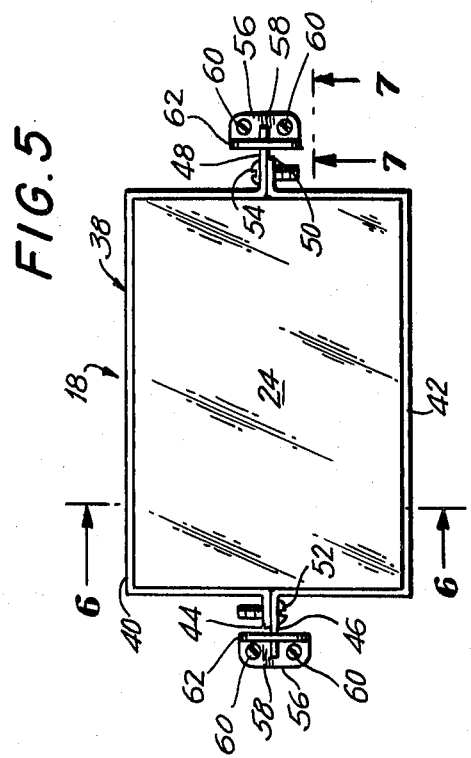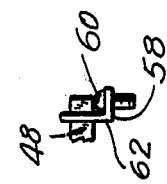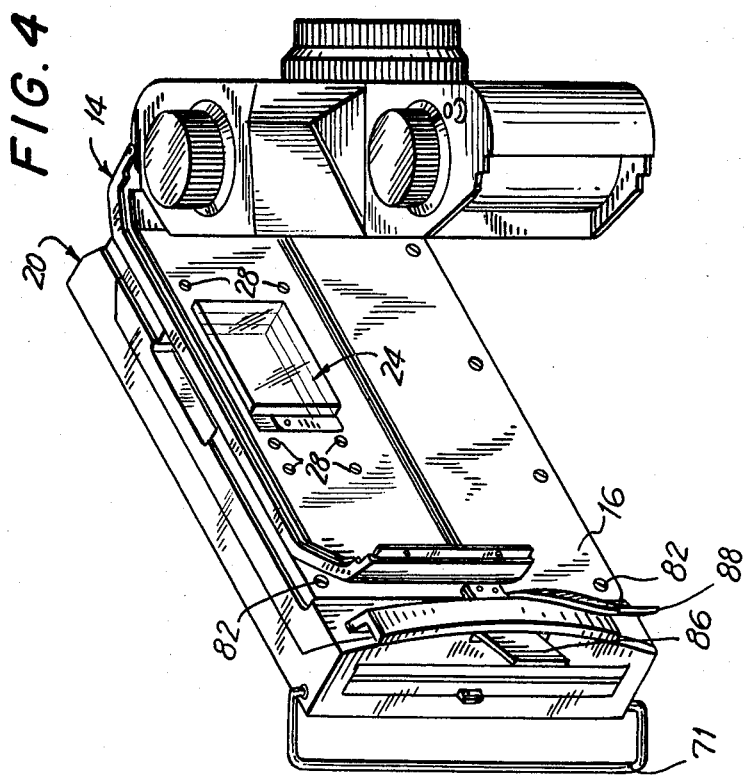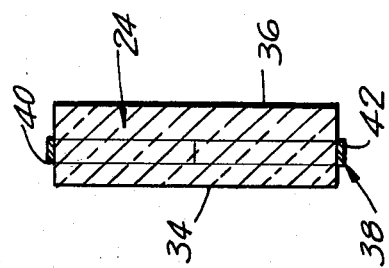

CAMERA ATTACHMENT FOR OBTAINING INSTANTANEOUS CONTACT PRINTS

BACKGROUND OF THE INVENTION

The present invention relates to an attachment for a camera for obtaining an instantaneous contact print of a picture taken through the camera, and particularly for a 35 mm. camera.

Polaroid film has long been relied on by professional photographers to test lighting and composition prior to the actual picture taking. There has never been, however, an effective way of getting an instant picture from a 35 mm. camera, the most commonly used professional camera. Thus, a professional photographer using a 35 mm. camera has had no effective way of determining in advance whether he has selected the proper exposure, lighting, lens, filter, etc.

Accordingly, a professional photographer who may be on an assignment to photograph an important historical event or a model within a studio setting may not discover until his film is developed that his pictures are not acceptable because of incorrect selection of the various parameters, when it is too late to recapture the historical event or too costly to reproduce the studio setting. It is when this occurs that even the most experienced photographers long for some device that would tell them what is really happening with the camera, whether the object to be photographed has been properly arranged, whether the lighting, exposure and lens have been properly selected.

The obvious way to ascertain the answers to all these questions is to use Polaroid film in order to get an instant print. Toward such end, there have been provided Polaroid backs for certain cameras but these have been unsatisfactory because they either require their own additional optical systems, or such permanent alteration of the camera body as to render the camera no longer usable with the intended film. Examples of such prior art cameras adapted to provide instant pictures on Polaroid film are shown in U.S. Pat. No. 3,266,696 and 3,852,780.

There has heretofore never been provided, for a 35 mm. camera, an attachment enabling the obtaining of an instantaneous contact print on Polaroid film of a picture taken through the regular optical system of the camera, without mutilating the camera to such an extent that it is no longer capable of using conventional 35 mm. film, and without discernible loss of light and/or degradation of the photographic image.

It is therefore an object of the invention to provide, for a 35 mm. camera in particular, an easily attachable assembly which enables the photographer to obtain an instantaneous contact pring on Polaroid film without any discernible loss of light and without changes in the image characteristics.

SUMMARY OF THE INVENTION

The subject invention is based on the provision of a Polaroid back externally of the 35 mm. camera body, so as not to mutilate said camera body, and upon the use of a fiber optic face plate to transfer the image formed within the camera body at the focal plane thereof to the plane of the Polaroid film within the Polaroid back.

As is shown in the art, a fiber optic is a very thin transparent homogeneous filament of glass enclosed with material of lower index of refraction which transmits light throughout its length by internal reflections without discernible loss. A fiber optic bundle comprises tens of thousands of such filaments epoxied together to form a continuous surface. A fiber optic face plate, as used herein, consists of a rectangular slice of such bundle, approximately ½" thick, whose opposite faces constitute the collective opposite ends, respectively, of the fibers forming the bundle. Thus an image projected on one side of the fiber optic face plate is transferred to the opposite side essentially unchanged. Examples of applications for fiber optics are shown in U.S. Pat. Nos. 2,939,362, 3,586,895 and 4,089,016.

In accordance with the invention, a back identical to the removable back of the 35 mm. camera is cut so as to define a rectangular opening in which there is mounted the fiber optic face plate. A conventional Polaroid back, similar to the Model 102, adapted to handle any conventional 3¼"×4¼" rectangular Polaroid pack film is then permanently attached to the modified back of the 35 mm. camera. The fiber optic face plate is approximately ½" thick and is mounted within the back of the camera so as to have one face thereof in the normal focal plane of the 35 mm. camera, and the opposite face thereof in the plane of the Polaroid film housed in the Polaroid back.

In order to test the camera parameters and object composition, the photographer attaches the 35 mm. camera back, modified as aforedescribed and loaded with Polaroid film, onto his regular 35 mm. camera and shoots the picture as he normally would, using whatever settings, lighting and lens he is testing. The image will be formed by the camera's optical system on the face of the fiber optic face plate which is in the camera's focal plane. The identical image is simultaneously transferred or displaced, essentially unchanged and without discernible loss of light efficiency, to the opposite face of the fiber optic face plate which is in the plane of the Polaroid film so as to create an instantaneous contact print of the image. After checking the print and making adjustments, if necessary, the modified camera back is detached from the camera and replaced with the camera's normal (unmodified) back, permitting the photographer to shoot his picture on regular 35 mm. film, assured that his picture will be satisfactory.

It is apparent that the attachment in accordance with the invention may be used in association with any 35 mm. camera whose back cover can easily be removed. It will also be evident that the use of the fiber optic face plate in accordance with the invention, which transfers the image from the focal plane of the camera to a plane exteriorly of the camera body and in contact with the Polaroid film, makes it unnecessary to use additional optical systems since the regular optical system remains intact.

BRIEF DESCRIPTION OF THE DRAWINGS

FIG. 1 is an exploded perspective view of the attachment assembly in accordance with the invention;

FIG. 4 is a view similar to FIG. 2, but showing the camera body in partially open condition;

FIG. 5 is a front elevational view of the fiber optic face plate assembly;

FIG. 6 is a sectional view taken along line 6—6 of FIG. 5; and

FIG. 7 is a view taken in the direction of line 7—7 of FIG. 5.

DESCRIPTION OF THE PREFERRED EMBODIMENT

Figure 3:
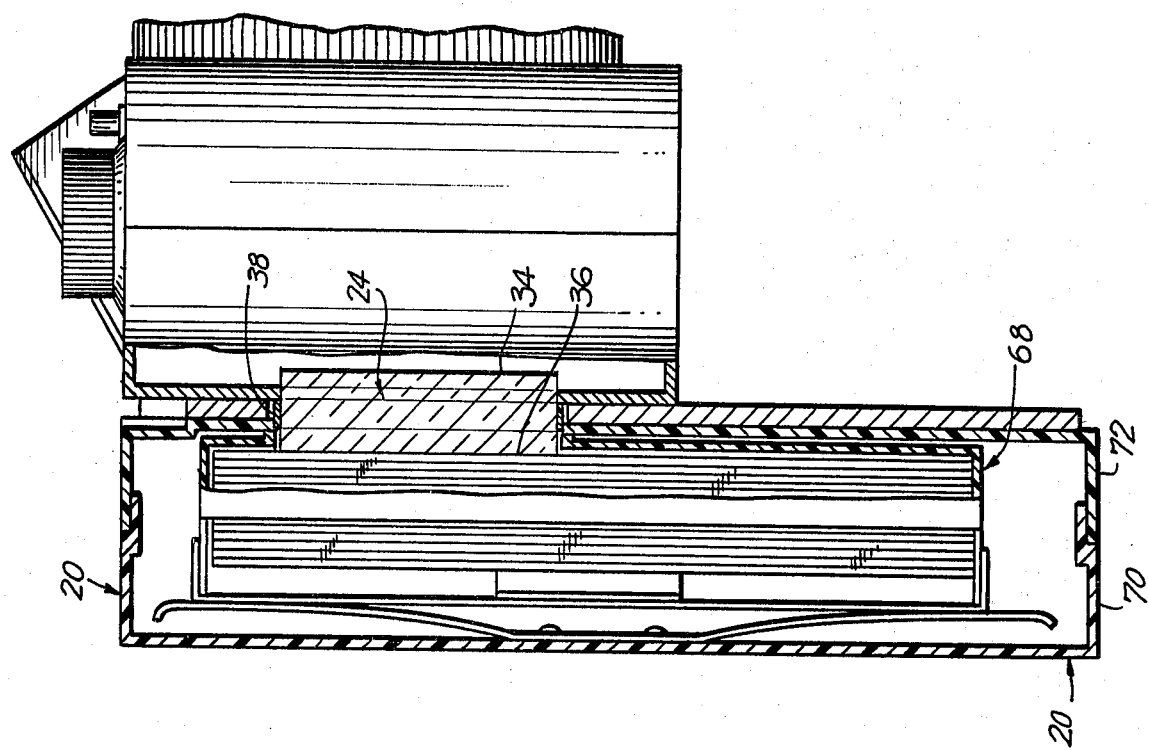
FIG. 3 is a sectional view taken along line 3—3 of FIG. 2 on an enlarged scale.

Assembly 10 comprises auxiliary back member 14, mounting plate 16, fiber optic face plate assembly 18 and Polaroid back member 20, shown in opened condition.

Auxiliary back member 14 is, in essence, the regular back cover of camera 12, stripped of its pressure plate and readily attachable to and detachable from the camera body by depressing a spring-loaded pin (not shown). Auxiliary back member 14 is provided with a rectangular cutout or opening 22 for receiving threrethrough the fiber optic face plate 24 as more fully described hereafter.

Mounting plate 16 is of substantially rectangular shape and is provided with rectangular cutout 26 having the same size as cutout 22 in auxiliary back member 14. Mounting plate 16 is secured to auxiliary back member 14 by means of screws 28 which are threaded through aligned threaded holes 30 and 32, in back member 14 and mounting plate 16, respectively. When so secured together, cutouts 22 and 26 are in juxtaposed aligned relation.

As best shown in FIGS. 5-7, fiber optic face plate assembly 18 comprises the fiber optic face plate 24 having a rectangular cross section approximately 40 mm.×30 mm. and having a thickness of approximately $\frac{1}{2}''$ depending on the particular 35 mm. camera in question, thus defining parallel front and rear faces 34 and 36, respectively. Fiber optic face plate 24 is mounted within frame 38 composed of upper frame member 40 and lower frame member 42, terminating in overlapping laterally extending portions 44-46 at one side and 48-50 at the opposite side, suitably clamped together by screws 52 and 54, respectively. Fiber optic face plate assembly 18 is secured to mounting plate 16 by means of L-shaped brackets 56, having one leg 58 thereof secured to the mounting plate 16 with screws 60 and having the other leg 62 thereof suitably slotted to receive the free end of overlapping portion 46 at one side and the free end of overlapping portion 48 at the other side of the frame member. To facilitate the securement of and to properly position the fiber optic face plate assembly 18 with respect to the mounting plate 16, the latter is countersunk as at 64 and provided with threaded holes 66 to receive screws 60.

It will be understood that the mounting plate and the various components of the fiber optic face plate assembly are dimensioned so that when the auxiliary back member 14 is mounted onto the camera, front surface 34 of fiber optic face plate 24 will be in the focal plane of the camera, precisely where the 35 mm. film would be exposed when a picture is taken.

The last component forming assembly 10 is the conventional Polaroid back 20, such as commonly indentified as Model 102 which is adapted to handle any conventional $3\frac{1}{4}''\times 4\frac{1}{4}''$ rectangular Polaroid film pack identified in FIG. 1 by reference character 68.

Figure 2:
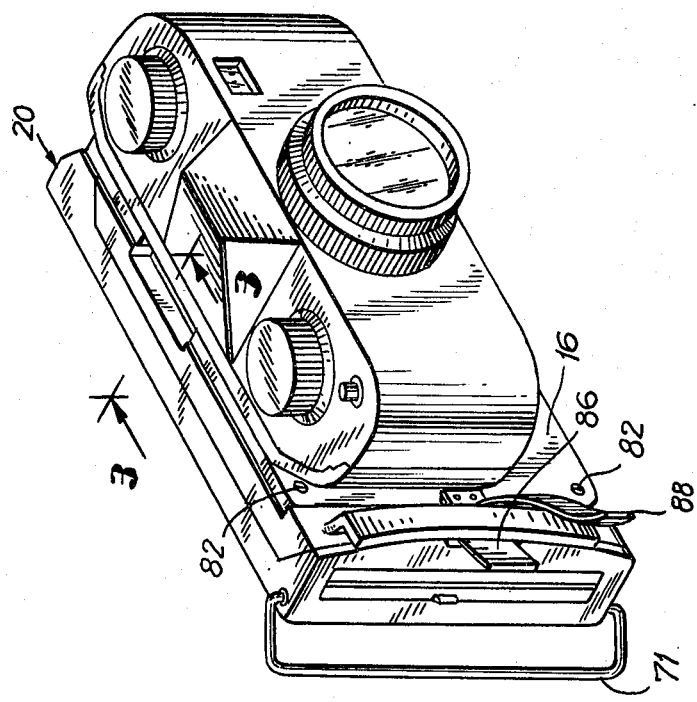
FIG. 2 is a perspective view of the attachment assembly mounted on a conventional 35 mm. camera.

As best seen in FIG. 1, Polaroid back 20 comprises housing members 70 and 72 pivotally movable relative to each other between an open or film loading condition as shown in FIG. 1 and a closed condition as shown in FIG. 2. A latch 71 is provided on housing member 70 which is adapted to snap in a complementary groove in housing member 72 for maintaining the Polaroid back in closed condition. Housing member 70 contains the Polaroid film developing mechanism, well known in the art and generally identified by numeral 74. Housing member 72 defines the compartment which receives film pack 68, the latter having end 76 thereof inserted into recess 78 as shown by arrows A and spring snapped into proper position. The outer wall of housing member 72 has a large rectangular cutout 80 to permit the film in pack 68 to be exposed when a picture is taken through the camera to which the Polaroid back is normally secured.

In accordance with the invention, the conventional Polaroid back 20 is secured to mounting plate 16 by screws 82 threaded through holes 84 in mounting plate 16 and complementary threaded holes (not shown) on the periphery of the outer wall of housing member 72. When so secured, rear face 36 of fiber optic face plate 24 is in surface to surface contact with the Polaroid film when the Polaroid back is loaded with the film pack.

Once assembly 10 is secured together in the aforedescribed manner it is attached to the 35 mm. camera simply by mounting auxiliary back member to the camera whose regular back has been removed, as shown in FIGS. 2, 3 and 4. The photographer is now ready to shoot his picture and obtain an instantaneous contact print on the Polaroid film. More specifically, the image will be initially formed on front surface 34 of fiber optic face plate 24 which is in the regular focal plane of the camera, and such image will be instantaneously transferred, without loss of light or degradation, to rear surface 36 of the fiber optic face plate which is in surface to surface contact with the Polaroid film in Polaroid back 20. The white tab 86 on the Polaroid film is then pulled, in conventional manner, to withdraw the film which is instantaneously developed to enable the photographer to examine the print and determine whether any adjustments need to be made. Once the photographer is satisfied with the picture, he detaches the assembly 10 from the camera and replaces it with the regular camera back, enabling him to shoot his picture on 35 mm. film, without fear of failure. Alternatively, in order to save time, a photographer may use two separate, but identical, 35 mm. cameras, one provided with assembly 10 and the other with its regular back and loaded with 35 mm. film.

The conventional Polaroid film, being $3\frac{1}{4}''\times 4\frac{1}{4}''$ enables two side by side images to be gotton on a single piece of film. This is accomplished by taking and first exposure, then withdrawing the white pull tab 86 halfway, taking the second exposure, and thereafter pulling tab 86 all the way out to draw the film through the developing rollers of the Polaroid back to develop both exposures in the normal way. In order to facilitate the first withdrawal, there is provided in accordance with an additional feature of the invention a measuring tab 88 secured to mounting plate 16, shown in phantom in FIG. 1, to guide the photographer for the initial withdrawal.

Thus it is seen that the present invention provides, for the first time, an attachment for a 35 mm. camera which enables the photographer to obtain an instantaneous contact print on Polaroid film of an image taken through the camera's regular optical system without any discernible loss of light, without any change in the image characteristics, and without mutilating the camera. Such achievement has been made possible by the use of a fiber optic face plate which transfers the image formed in the focal plane of the camera to the surface of Polaroid film in a conventional Polaroid back.

While the invention has been described as being particularly suitable for use with a 35 mm. camera and a Polaroid back, it will be understood that the invention herein could be equally applicable to other types of cameras and with other instantaneous film backs.

While there is herein shown and described the preferred embodiment of the invention, it will be understood that the invention may be embodied otherwise than as herein specifically illustrated or described, and that in the illustrated embodiment certain changes in the details of construction and in the form and arrangement of parts may be made without departing from the underlying idea or principles of this invention within the scope of the appended claims.

Having thus described my invention, what I claim and desire to secure by Letters Patent is:

1. An attachment to a camera for obtaining instantaneous photographic prints of pictures taken by said camera, said camera being of the type adapted to form images on an image plane inwardly of and in substantially parallel spaced relation with the rear wall of said camera body, and said rear wall forming part of the camera back which is removably securable to the remainder of said camera body, said attachment comprising,
 (a) an auxiliary back member having the same shape and peripheral dimensions as said camera back and adapted to be secured to said remainder of said camera body in the same manner as said camera back, said auxiliary back member being provided with a cutout,
 (b) a fiber optic face plate having opposed parallel front and rear surfaces, mounted within said cutout so that said front surface is co-planar with said image plane when said auxiliary back member is secured to said remainder of said camera body, and said rear surface is disposed in a plane parallel to said image plane but externally of said auxiliary back member whereby an image formed by said camera on the front surface of said fiber optic face plate is transferred to said rear surface thereof, and
 (c) a housing adapted to receive instant picture forming film secured to said auxiliary back member so that picture forming film received in said housing is substantially co-planar with the rear surface of said fiber optic face plate whereby an image formed by said camera on said image plane is automatically transferred by said fiber optic face plate to the plane of the instant picture forming film to enable instantaneous printing of said image on said film.

2. An attachment in accordance with claim 1, wherein there is provided a mounting plate secured between said auxiliary back member and said instant picture forming film receiving housing, said mounting plate having a cutout in registry with the cutout in said auxiliary back member, and said fiber optic face plate being secured to said mounting plate and extending through said cutouts.

3. An attachment in accordance with claim 1 or 2, wherein said camera is a 35 mm. camera having a removable back.

4. An attachment in accordance with claim 1 or 2, wherein said housing adapted to receive instant picture forming film is a Polaroid back.

5. An attachment in accordance with claim 1 or 2 wherein said camera is a 35 mm. camera having a removable back and said housing adapted to receive instant picture forming film is a Polaroid back.

6. An attachment in accordance with claim 2 wherein said housing adapted to receive instant picture forming film is a Polaroid back and wherein said mounting plate is provided with a measuring tab whereby to guide withdrawal of the Polaroid film a measured amount following a first exposure to permit a second exposure to be made on said film.

7. An attachment to a camera for obtaining instantaneous prints of pictures taken by said camera comprising,
 (a) a fiber optic face plate having opposed front and rear surfaces adapted to be secured to the back of said camera with said front surface being in the focal plane of said camera whereby an image formed on said front surface is transferred to said rear surface, and
 (b) a housing adapted to receive instant picture forming film adapted to be secured to said camera so that picture forming film in said housing is in surface to surface contact with the rear surface of said fiber optic face plate whereby the image formed on said front surface is automatically transferred to said film to enable instantaneous printing of said image on said film.

8. An attachment in accordance with claim 7, wherein said camera is a 35 mm. camera having a removable back and said housing is a Polaroid back.

9. An attachment in accordance with claim 8, wherein said fiber optic face plate and said housing are secured to the removable back of said camera.

* * * * *